United States Patent [19]

Kaneko

[11] Patent Number: 4,496,994
[45] Date of Patent: Jan. 29, 1985

[54] NOISE IMMUNE DATA REGENERATING CIRCUIT FOR VIDEO SIGNAL REPRODUCTION

[75] Inventor: Kenji Kaneko, Iwai, Japan

[73] Assignee: Victor Company of Japan, Limited, Japan

[21] Appl. No.: 392,303

[22] Filed: Jun. 25, 1982

[30] Foreign Application Priority Data

Jun. 27, 1981 [JP] Japan ................................. 56-99860

[51] Int. Cl.³ ............................................. H04N 5/94
[52] U.S. Cl. .................................. 358/336; 360/38.1; 360/37.1
[58] Field of Search ............... 358/336, 147, 314, 155; 360/38.1, 37.1; 375/108, 111

[56] References Cited

U.S. PATENT DOCUMENTS

| | | | |
|---|---|---|---|
| 3,947,873 | 3/1976 | Buchor | 360/38.1 |
| 4,157,567 | 6/1979 | Scholz | 358/336 |
| 4,175,267 | 11/1979 | Tachi | 358/147 |

*Primary Examiner*—Alan Faber
*Attorney, Agent, or Firm*—Lowe, King, Price & Becker

[57] ABSTRACT

A data regenerating circuit is included in a video disk recording and playback systems in which the video disk is controlled in a desired mode in response to selected digital control data contained in the vertical blanking intervals of a recorded video signal. The circuit includes a random noise detector for detecting noise that might occur in the vertical blanking interval to prevent the control system from operating the disk in an undesired mode.

4 Claims, 3 Drawing Figures

NOISE IMMUNE DATA REGENERATING CIRCUIT FOR VIDEO SIGNAL REPRODUCTION

BACKGROUND OF THE INVENTION

The present invention relates generally to reproduction of disk-recorded video signals having control data, and in particular to a data regenerating circuit which eliminates the effect of random noise introduced to the control data.

Video disk recording currently known in the art is broadly classified into two systems. One system employs grooveless disks in which signals are recorded in the form of minute pits with a tracking signal and detected upon reproduction as capacitance or optical density variations. Another system employs grooved disks in which signals are recorded along the grooves with no tracking signals. Since the grooveless type allows the pickup stylus to move transversely across the grooves, stylus control data are inserted to the vertical blanking interval of the recorded composite video signal to permit the stylus to have rapid access to any desired track in response to a manual command signal, whereby the disk can be operated in a variety of modes including slow-motion, standstill picture and searching. However, due to the presence of dust on the disk record random noise is likely to contaminate the control data and the disk is caused to operate in an undesired mode.

SUMMARY OF THE INVENTION

According to a broader aspect of the invention, a data regenerating circuit is provided for video disk recording and playback systems which eliminates the prior art disadvantage by detecting random noise that occurs in the vertical blanking interval of a reproduced video signal and disabling the control data contained in the video signal.

Preferably the noise detection is provided by a circuit comprising a monostable multivibrator responsive to each of the vertical synchronization pulses which occur at the beginning of each vertical blanking interval. The monostable multivibrator produces a pulse having a duration smaller than the interpulse spacing of the vertical synchronization pulses, so that the multivibrator will respond to random noise by generating pulses with the resultant increase in the total of the pulse durations. An integrator is provided to generate a voltage signal indicative of the total pulse duration of the monostable multivibrator, the voltage signal being compared with a reference value. In the presence of random noise, the voltage signal exceeds the reference and a disabling signal is generated to inhibit the control data which are regenerated subsequently to the vertical synchronization pulses.

According to a specific aspect of the invention, a video disk playback system is provided which comprises a known manual control circuit which processes the regenerated control data in response to locally generated clock pulses. A circuit is provided to derive clock pulses from the regenerated control data to clock the control data into a shift register until all the bits of control data are stored. A noise detector detects the presence of randomly occurring noise pulses which might occur in the vertical blanking intervals and generates therefrom a disabling signal. The shift register is arranged so that it responds in the absence of the disabling signal to the locally generated clock pulses by successively delivering the stored control data to the manual control circuit.

BRIEF DESCRIPTION OF THE DRAWINGS

The present invention will be described in further detail with reference to the accompanying drawings, in which.

DETAILED DESCRIPTION

Figure 1:
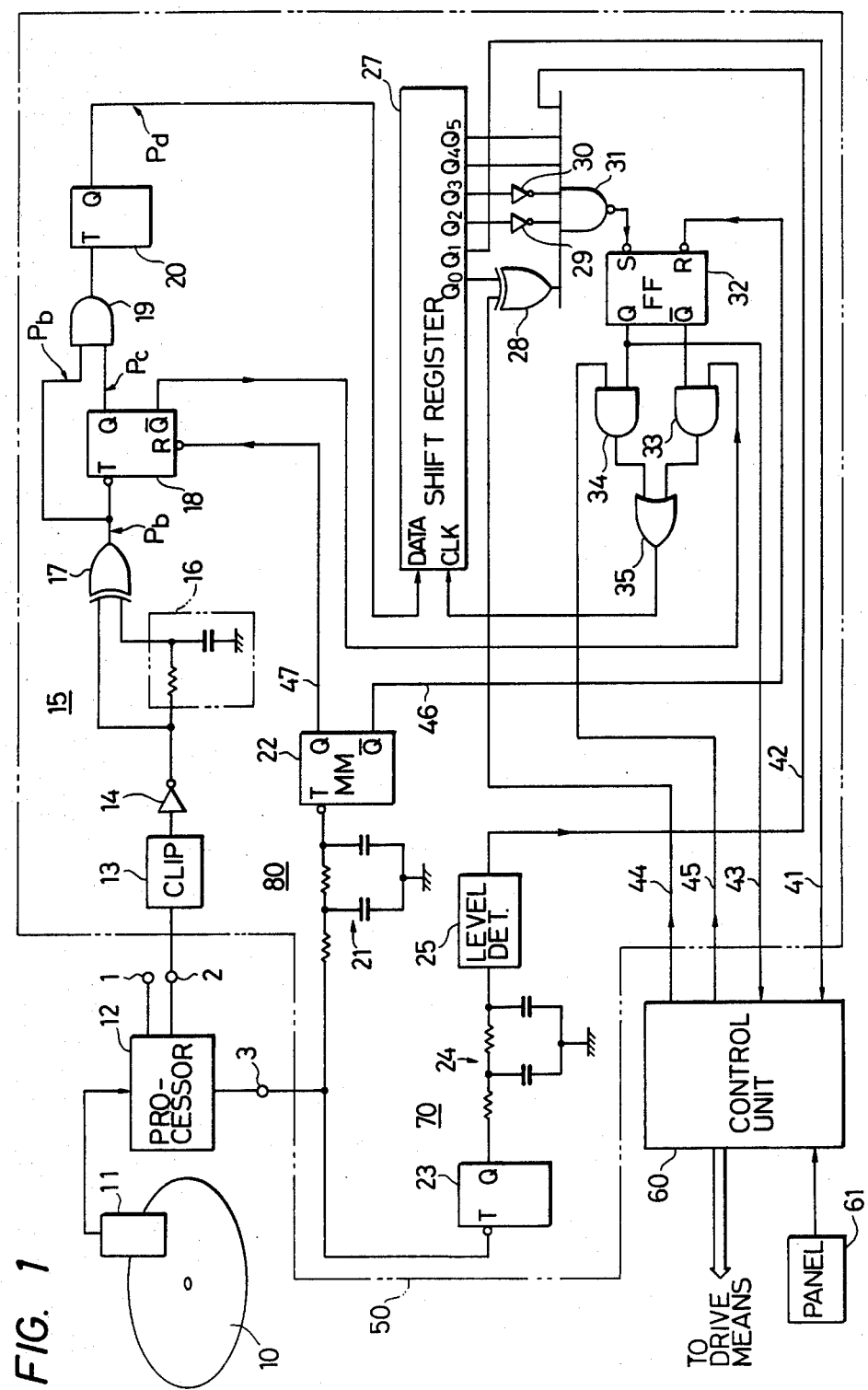
FIG. 1 is an illustration of a block diagram of a preferred embodiment of the invention.

Referring now to FIG. 1, there is shown an embodiment of the present invention. Illustrated at 10 is a video disk which contains a composite video signal, an audio signal, and digital control data inserted to predetermined horizontal periods of the vertical blanking interval. The video disk 10 is reproduced by a pickup element 11 which may be a laser sensing device as used in optical video disks or a capacitance detection device as used in capacitance disks, the signal detected by the pickup element 11 being fed to a known processor 12 where the signal is frequency demodulated and divided into individual components for application to an audio terminal 1, a video terminal 2 and a sync terminal 3. The composite video signal at terminal 2 and the vertical and horizontal synchronization signals at terminal 3 are also applied to a data regenerating circuit generally indicated at 50.

Figure 2:
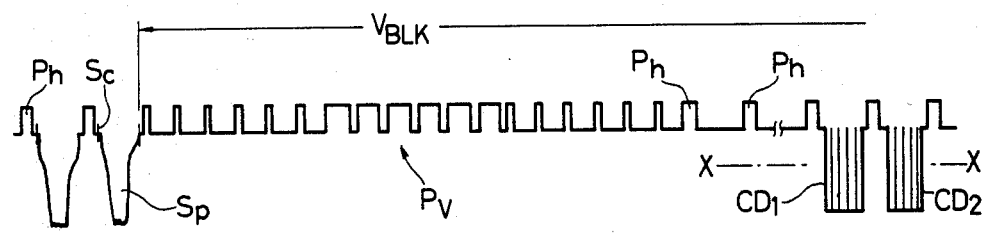
FIG. 2 is an illustration of a waveform of a composite video signal.

Before describing the detail of the data regenerating circuit 50, reference is made to FIG. 2 in which is partially illustrated a vertical blanking interval of the composite video signal in which the digital control data are inserted. Illustrated at Ph is a horizontal synchronization pulse which appears with color bursts Sc and video signals Sp during vertical trace periods and also appears during the vertical blanking interval $V_{BLK}$ according to the well known standard format. The vertical synchronization pulses are indicated at Pv which appear in the blanking interval $V_{BLK}$ with equalizing pulses wherein each pulse of the vertical sync and equalizing pulse trains occurs at one-half the horizontal period H. Indicated at CD1 is first digital control data which appears on the 17th horizontal period of the blanking interval during odd-numbered fields and on the 280th horizontal period during even-numbered fields. Second digital control data CD2 are inserted to the 18th horizontal period during odd-numbered fields and to the 281st horizontal period during even-numbered fields.

According to a typical example of coding formats, the first control data CD1 comprise a total of 29 bits including a framing code "1100", a CD1 identifying code "11", "00" for monaural mode indication, "01" for stereo mode indication, "10" for indication of "bilingual" mode, a stop indicating code "11" and 8 bits (2 digits of binary coded decimal) for indicating band separation, 12 bits of in-band address information for indicating the location of each track within the identified band, and a single parity bit. Likewise, the second control data CD2 also comprise a total of 29 bits which are organized by a similar code form with the exception that "10" is given to the CD2 idenfying code. The band separation identifying code contains information as to the beginning of each band and is given in terms of "minutes" counted from the outermost track of the disk when it spins at normal speed. The 12-bit in-band address information contains data indicating each track number within each band and is given by 8 bits in terms of "seconds" counted from the beginning of the band and by 4 bits in terms of frame number within the period of a second. The digital control signals CD1 and CD2 are recorded in the form of frequency modulated, biphase space-coded signal, a code form which permits the recovery of the original data upon self-clocked demodulation.

Figure 3:
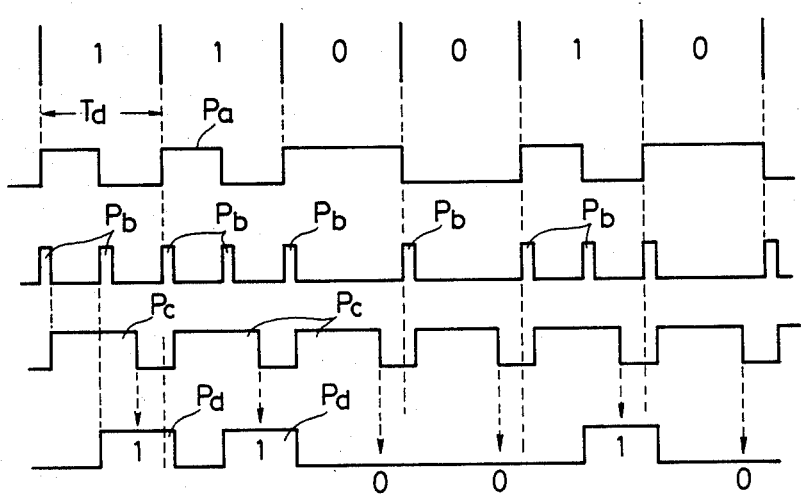
FIG. 3 is an illustration of waveforms useful for describing the operation of the block diagram of FIG. 1.

Returning to FIG. 1, the data regenerating circuit 50 comprises a clipping circuit 13 which clips the composite video signal at a level x lower than the pedestal level indicated in FIG. 2 to extract the digital control signals CD1 and CD2, the clipped signals being inverted in polarity by an inverter 14 and applied to an edge detector 15. For purposes of illustration the waveform the signal obtained at the output of inverter 14 for the first six bits of the second digital control signal CD2 (including the framing and identifying codes) is indicated at Pa in FIG. 3. It is seen that bit "1" is represented by a squarewave pulse with an interpulse spacing Td and bit "0" is represented by a squarewave pulse of either high or low level with a duration Td. Thus, each bit occurs at intervals Td. The edge detector 15 comprises a CR delay circuit 16 for introducing a delay time to the output of the inverter 14 and an Exclusive-OR gate 17 having a pair of inputs coupled to the non-delayed and delayed signals to generate narrow-width pulses Pb at each of the leading and trailing edges of the pulses Pa.

The output of the Exclusive-OR gate 17 is coupled to the trigger input T of a monostable multivibrator 18 to generate a pulse Pc having a duration which is ¾ of the interval Td of the data pulse Pa when the reset input R is at a high voltage level. The pulse Pc occurs at intervals Td at the Q output of multivibrator 18 and is used as a data regenerating clock pulse for enabling an AND gate 19 to pass the pulse Pb from the edge detector 15 to the trigger input of a monostable multivibrator 20. The multivibrator 20 generates a pulse Pd having a duration approximately one-half the interval Td. It is seen from FIG. 3 that the original data can be regenerated by sampling the pulses Pd in response to the trailing edge of the clock pulse Pc.

In FIG. 1, the output of multivibrator 20 is coupled to the data input of a shift register 27 in which the 29 bits of control data are sequentially shifted in response to the leading edge of the complementary output of the clock generating multivibrator 18. This clock pulse is supplied to the clock terminal of shift register 27 through an AND gate 33 and an OR gate 35 when the AND gate 33 is enabled by the complementary output of a flip-flop 32 whose function will be described hereinbelow.

The data regenerating circuit 50 includes a vertical sync separator 80 comprising a CR integrator 21 which integrates the pulses on terminal 3, the integrated output being coupled to the trigger input a monostable multivibrator 22. The time constant value of the integrator 21 is chosen so that it develops a voltage higher than the threshold of the multivibrator 22 only in response to the vertical sync pulses Pv. The multivibrator 22 is thus triggered in response to the vertical synchronization to provide a pulse having, typically, one milisecond on lead 47 to the reset input of the multivibrator 18 even when random noise is present in the pulse train on terminal 3. This multivibrator 18 is thus enabled for a 1-milisecond period from the time of occurrence of a vertical synchronization signal to the time of occurrence of the 19th horizontal sync pulse during each vertical blanking interval. The complementary output of the multivibrator 22 is coupled on lead 46 to reset the flip-flop 32 generating a high level signal on the complementary output thereof.

Therefore, the flip-flop 32 is triggered into a reset condition in response to a vertical synchronization signal to enable the AND gate 33 at the beginning of each vertical blanking interval. The data bits are thus shifted in register 27 in response to the clock pulses supplied through the AND gate 33 from the multivibrator 18. When the shift register 27 is loaded with all the 29 bits, the stored framing code bits (1100) are delivered from Q5, Q4, Q3 and Q2 output terminals to a NAND gate 31 with the bits on terminals Q3 and Q2 being coupled via inverters 30 and 29. The most significant bit of the stored identifying code is delivered from terminal Q1 on lead 41 to a control circuit 60 which, as is known in the art, supplies control signals to various parts of the stylus and disk drive systems, not shown. The least significant bit the identifying code is supplied from terminal Q0 to one input of an Exclusive-OR gate 28 the output of which is coupled to the NAND gate 31. The output of NAND gate 31 is connected to the set input of flip-flop 32 whose Q output is coupled to an AND gate 34 and through lead 43 to the control circuit 60. The output of the AND gate 34 is coupled via OR gate 35 to the clock input of the shift register 27.

The control circuit 60 is responsive to an operator-control panel 61 and a signal on lead 41 to place a low or high level voltage on lead 44 when it receives a CD1 or CD2 select command signal from the panel 61, respectively. The voltage signal on lead 44 is applied to the Exclusive-OR gate 28 so that the latter detects the CD1 identifying code "11" or CD2 identifying code "10" by generating a high voltage output. The input condition of the NAND gate 31 is satisfied when the framing and identifying codes are detected provided that a high level output is applied thereto on lead 42 from the output of a random noise detector 70 when no random noise is present. When this occurs a low level signal from the NAND gate 31 triggers the flip-flop 32 into a set condition and a "ready" signal is applied on lead 43 to the control circuit 60 to enable the input from the terminal Q1 of shift register 27. Simultaneously, the AND gate 33 is disabled and the AND gate 34 is enabled instead to pass shift pulses which are supplied on lead 45 from the control circuit 60 to the clock terminal of shift register 27 to deliver the stored control data bits (excepting the framing code bits) from terminal Q1 on lead 41 to the control circuit 60. The disk reproducing system is allowed to operate in response to the valid control data. When random noise is present the NAND gate 31 is disabled in a manner as detailed below and no "ready" signal is generated for the control circuit 60 with the result that the latter invalidates the control data bits supplied from terminal Q1 to keep the disk reproducing system from responding to the invalid control data. When this occurs, the flip-flop 32 remains in the reset condition and the clock pulse from the multivibrator 18 is used to shift the data bits.

6 The random noise detector 70 comprises a retriggerable monostable multivibrator 23 coupled to the terminal 3 for generating a noise discriminating pulse having a duration ¼ the horizontal period H in response to the leading edge of each equaling, vertical and horizontal synchronization pulse so that the H/4-duration pulses occur regularly at H/2 intervals during the reception of the equalizing and vertical synchronization pulses and regularly at H intervals during the reception of the horizontal synchronization pulses. If the pulse train on terminal 3 is contaminated with random-noise pulses, the retriggerable monostable multivibrator 23 will be retriggered during its quasistable state increasing its pulse duration. The pulses from multivibrator 23 are integrated by an integrator 24 to generate a voltage proportional to the total of their durations. A level detector 25 is coupled to the output of integrator 24. When random noise is present the output of integrator 24 becomes higher than the threshold of the level detector 25 so that the output of random noise detector 70 switches to a low voltage level to disable the NAND gate 31 generating a high level output, whereby the flip-flop 32 remains in the reset condition.

What is claimed is:

1. A system for reproducing a recording medium having a composite video signal framed at vertical blanking intervals including vertical and horizontal synchronization pulses and digital control data recorded in specified portions of the vertical blanking interval which are subsequent to said vertical synchronization pulse, comprising:
   manual control means for processing said digital control data and including means for generating first clock pulses;
   a shift register;
   first means for deriving second clock pulses from said control data;
   third means for detecting when said digital control data are stored in said shift register;
   fourth means for detecting the presence of randomly occurring noise pulses which might occur in said vertical blanking intervals and generating therefrom a disabling signal; and
   fifth means responsive to said vertical synchronization pulse to cause said shift register to respond to said second clock pulses by successively storing said control data therein and subsequently responsive to said third means in the absence of said disabling signal to cause said shift register to respond to said first clock pulses by delivering the stored control data to said manual control means.

2. A system circuit as claimed in claim 1, wherein said fourth means comprises:
   monostable multivibrator means responsive to said synchronizaton pulses and said noise pulses;
   means for integrating the output of said monostable multivibrator means; and
   means for detecting when the output of said integrator means exceeds a predetermined value and generating therefrom said disabling signal.

3. A system circuit as claimed in claim 2, wherein said monostable multivibrator means comprises a retriggerable monostable multivibrator.

4. A system as claimed in claim 3, wherein said fifth means comprises a flip-flop having a first input terminal responsive to said third means in the absence of said disabling signal to generate a first output signal and a second input terminal responsive to said vertical synchronization pulse to generate a second output signal, and gate means for respectively applying said first and second clock pulses to said shift register in response to said first and second output signals for shifting said control data in said shift register.

* * * * *